April 22, 1969   E. KRESTEL ET AL   3,440,506
SPEED CONTROL CIRCUIT FOR ELECTRONICALLY COMMUTATED DC MOTOR
Filed Nov. 8, 1966

United States Patent Office 3,440,506
Patented Apr. 22, 1969

3,440,506
SPEED CONTROL CIRCUIT FOR ELECTRONICALLY COMMUTATED DC MOTOR
Erich Krestel, Erlangen, and Erich Rainer, Nuremberg, Germany, assignors to Siemens Aktiengesellschaft, a corporation of Germany
Filed Nov. 8, 1966, Ser. No. 592,775
Claims priority, application Germany, Nov. 12, 1965, S 100,472
Int. Cl. H02k 29/02; H02p 1/18
U.S. Cl. 318—138                          10 Claims The present invention relates to a speed control circuit for an electronically commutated DC motor.

Copending patent application Ser. No. 504,308, filed Oct. 24, 1965 and now abandoned, and assigned to the assignee of the present application, discloses an electronically commutated DC motor wherein each phase of the stator coil is subdivided into two coil or winding portions. The center points of each set of coil portions are connected to each other. The emitter-collector path of a switching transistor is connected in series with each winding portion. The base electrodes of the two switching transistors of each phase are connected to each other via the Hall electrodes of a pair of Hall generators. The control electrodes of the Hall generators are connected to each other via a resistor. The two pairs of transistors and the two Hall generators are so connected that an emitter-base current can flow through all of said transistors as long as one or more of said transistors is not cut off, blocked or made non-conductive by a Hall voltage of suitable polarity.

The principal object of the present invention is to provide a new and improved speed control circuit for an electronically commutated DC motor. The speed control circuit of the present invention is efficient, effective and reliable in operation and is of simple structure.

In accordance with the present invention, a speed control circuit is provided for an electronically commutated DC motor. The DC motor has a first phase and a second phase, a first phase stator winding and a second phase stator winding. The first phase stator winding is divided into two winding portions. The second phase stator winding is divided into two winding portions. A first connector connects one of the winding portions of the first phase stator winding to one of the winding portions of the second phase stator winding. A second connector connects the other of the winding portions of the first phase stator winding to the other of the winding portions of the second phase stator winding. A third connector connects a common point of the first connector with a common point of the second connector. A plurality of switching transistors each has emitter, collector and base electrodes, an emitter-collector path and an emitter-base path. A first of the transistors is connected with its emitter-collector path in series with one of the winding portions of the first phase stator winding. A second of the transistors is connected with its emitter-collector path in series with the other of the winding portions of the first phase stator winding. A third of the transistors is connected with its emitter-collector path in series with one of the winding portions of the second phase stator winding. A fourth of the transistors is connected with its emitter-collector path in series with the other of the winding portions of the second phase stator winding. A DC operating voltage is applied between one of the first and second transistors and one of the third and fourth transistors. First and second Hall generators are positioned in determined relation in a magnetic field of the DC motor. Each of the Hall generators has a pair of Hall voltage electrodes and a pair of control electrodes in spaced determined relation to the pair of Hall voltage electrodes. A fourth connector connects the base electrodes of the first and second transistors to each other via the Hall voltage electrodes of the first Hall generator. A fifth connector connects the base electrodes of the third and fourth transistors to each other via the Hall voltage electrodes of the second Hall generator. A sixth connector connects a control electrode of the first Hall generator to a corresponding control electrode of the second Hall generator via a resistor in a manner whereby a current flows through the emitter-base paths of the switching transistors when the Hall voltage of the Hall generators permits such current flow.

In accordance with the present invention, the speed control circuit comprises a fifth transistor having emitter, collector and base electrodes, an emitter-collector path and an emitter-base path. The fifth transistor is connected in the sixth connector with its emitter-collector path in series with the resistor between the corresponding control electrodes of the first and second Hall generators. A control circuit connected to the base electrode of the fifth transistor controls the conductive condition of the fifth transistor, thereby controlling the circuit condition of the sixth connector to control the operative condition of electronic commutation of the DC motor.

The control circuit comprises speed voltage means, which may comprise an additional stator winding of the DC motor, for providing a speed voltage proportional to the speed of the DC motor, constant voltage means for providing a substantially constant voltage and a comparator for comparing the speed voltage with the constant voltage. The control circuit further comprises a rectifier and filter having an output and an input connected to the additional stator winding for rectifying and filtering the speed voltage. The constant voltage means comprises a Zener diode connected to the output of the rectifier and filter. The control circuit further comprises a sixth transistor having emitter, collector path and an emitter-base path. The collector electrodes of the sixth transistor is connected to the base electrode of the fifth transistor. The Zener diode is connected in series with the emitter-base path of the sixth transistor. The constant voltage means may be replaced by variable voltage means for providing a variable voltage which is then compared with the speed voltage.

The speed voltage means may comprise the winding portions and the speed voltage may be derived directly from the winding portions.

In order that the present invention may be readily carried into effect, it will now be described with reference to the accompanying drawings, wherein.

Figure 1:
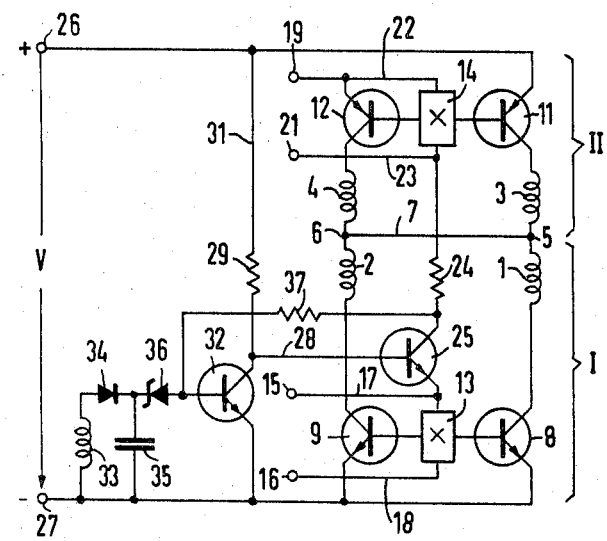
FIG. 1 is a circuit diagram of an embodiment of the speed control circuit of the present invention.

In FIG. 1, the DC motor comprises two phases I and II, each of phase I and phase II comprising a stator winding or coil. In the embodiment of FIG. 1, each stator winding of each phase of the DC motor is divided into two coil or winding portions. The stator winding of phase I is thus divided into winding portions 1 and 2, and the stator winding of phase II is divided into winding portions 3 and 4.

The winding portion 1 of phase I is connected to the winding portion 3 of phase II and the connection between said winding portions has a common point 5. The winding portion 2 of phase I is connected to the winding portion 4 of phase II and the connection of said winding portions has a common point 6. The common points 5 and 6 of the interphase winding portion connections are connected to each other via a lead 7. A first switching transistor 8 has an emitter-collector path connected in series with the winding portion 1 of phase I. A second switching transistor 9 has an emitter-collector path connected in series to the winding portion 2 of phase I. A third transistor 11 has an emitter-collector path connected in series with the winding portion 3 of phase II. A fourth switching transistor 12 has an emitter-collector path connected in series with the winding portion 4 of phase II.

The transistors 8 and 9 are NPN type transistors and the transistors 11 and 12 are PNP type transistors. The base electrode of the first switching transistor 8 and the base electrode of the second switching transistor 9 are connected to each other via the Hall electrodes of a first Hall generator 13. The base electrode of the third switching transistor 11 is connected to the base electrode of the fourth switching transistor 12 via the Hall electrodes of a second Hall generator 14.

A control current for controlling the first Hall generator 13 is supplied to the control electrodes of said Hall generator via input terminals 15 and 16 and leads 17 and 18, respectively. A control current for controlling the second Hall generator 14 is supplied to the control electrodes of said second Hall generator via terminals 19 and 21 and leads 22 and 23, respectively. The control electrodes of the first and second Hall generators 13 and 14 of phase I and phase II are connected to each other via a resistor 24 and the emitter-collector path of a fifth transistor 25. Thus, a control electrode of the first Hall generator 13 is connected in series with the emitter-collector path of the transistor 25, the resistor 24, and the corresponding control electrode of the second Hall generator 14.

When an operating DC voltage V is applied between input terminals 26 and 72, a base current can flow through the emitter electrodes of the first, second, third and fourth transistors 8, 9, 11 and 12, respectively. The base current switches the transistors ON, or to their conductive condition or unblocks the transistors if neither of the first and second Hall generators 13 and 14 generates a Hall voltage. Although the generation of a Hall voltage almost never occurs in actual operation, if a Hall voltage is generated, each of the winding portions 1, 2, 3 and 4 conducts a current.

The first and second Hall generators 13 and 14 are electrically phase shifted from each other by 90° and are positioned, for example, in the air gap of the DC motor. The Hall generators 13 and 14 are thus permeated by or subjected to the magnetic field of the permanently magnetized rotor of the DC motor in a manner whereby, due to their 90° phase different positions, the Hall voltages are electrically displaced from each other by 90°. The Hall generators 13 and 14 may be positioned in a location other than the air gap of the DC motor. The Hall generators 13 and 14 may thus be positioned in a bearing housing of the DC motor, where they are permeated by or subjected to the magnetic field of a control member coupled to and rotated with the shaft of the DC motor.

The polarity of the Hall voltages of the Hall generators 13 and 14 is such that the first and second transistors 8 and 9 of phase I and the third and fourth transistors 11 and 12 of phase II are alternately controlled in accordance with the desired direction of rotation of the rotor of the DC motor through a complete cycle of the induced voltages. The speed control voltage is such that the respective winding portion always conducts a current having an induced voltage which is opposite to the applied operating voltage V. The Hall voltages are substantially rectangular or square wave voltages and are electrically phase-displaced from each other by 90°, so that each of the Hall generators 13 and 14 has a corresponding Hall voltage with a polarity dependent upon the angle of rotation of the rotor of the DC motor. Thus, one of the two winding portions 3 and 4 of phase II always conducts a current. The rectangular or square wave voltages are provided by any suitable means such as, for example, baffle sheets and ferrite straps which affect the control magnetic field to which the Hall generators are subjected.

The first and second transistors 8 and 9 are conductive only during the zero passage of the Hall voltage of the Hall generator 13, so that both winding portions 1 and 2 conduct current simultaneously. The third and fourth transistors 11 and 12 are conductive only during the zero passage of the second Hall generator 14, so that both winding portions 3 and 4 conduct current simultaneously. Since the zero passage of the Hall voltage of each Hall generator is very steep, the duration of such zero passage is extremely brief, so that the corresponding transistors are conductive only for extremely brief periods of time.

In order to provide an appropriate rotary magnetic field, so that a specific direction of rotation may be attained, the individual winding portions must conduct current in the sequence of winding portion 1 to winding portion 3, winding portion 3 to winding portion 2, winding portion 2 to winding portion 4, winding portion 4 to winding portion 1, and so on, in repeated cycles. The switching sequence of the corresponding switching transistors is first transistor 8 to third transistor 11, third transistor 11 to second transistor 9, second transistor 9 to fourth transistor 12, fourth transistor 12 to first transistor 8, and so on, in repeated cycles.

The speed control for the aforedescribed electronically commutated DC motor is based upon the discovery of the inventors that when the connection between the control electrodes of the first and second Hall generators 13 and 14 is interrupted or broken, the electronic commutation of the DC motor becomes ineffective. This is due to the interruption of the base current which flows from the positive to the negative pole of the circuit, via the emitter electrodes of the third and fourth transistors 11 and 12, the connection between the control electrodes of the first and second Hall generators 13 and 14, the resistor 24 and the emitter electrodes of the first and second transistors 8 and 9. All the transistors 8, 9, 11 and 12 are thus OFF.

In accordance with the present invention, therefore, the emitter-collector path of the fifth transistor 25 is connected in series with the resistor 24 between the control electrodes of the first and second Hall generators 13 and 14. This enables the opening and closing of the connection between the control electrodes of the Hall generators in order to control or regulate the speed of the DC motor.

The base electrode of the fifth transistor 25 is connected via a lead 28, a resistor 29 and a lead 31 to the positive pole of the circuit. The base electrode of the fifth transistor 25 is connected via the lead 28 and the emitter-collector path of a sixth transistor 32 to the negative pole of the circuit. The fifth and sixth transistors are each of NPN type. Thus, as soon as the sixth transistor 32 is in its non-conductive or OFF condition, a positive potential is applied to the base electrode of the fifth transistor 25, and said fifth transistor is conductive, so that the electronic commutation functions normally.

When the sixth transistor 32 is in its conductive or ON condition, however, a negative potential is applied to the base electrode of the fifth transistor 25. The negative potential applied to its base electrode switches the fifth transistor 25 to its non-conductive or OFF condition, thereby opening the connection between the control electrodes of the first and second Hall generators 13 and 14 and switching off the electronic commutation.

The speed control of the rotor of the DC motor is provided by the comparison of a voltage proportional to such speed and a DC voltage which controls the conductive condition of the sixth transistor 32, thereby controlling the conductive condition of the fifth transistor 25. The comparison of the voltage proportional to the speed of the rotor of the DC motor for comparison with the DC voltage to provide the direct control voltage for the sixth transistor 32 is provided by a separate stator coil or winding 33. The winding 33 of the stator of the DC motor provides a voltage proportional to the speed of the rotor of said motor, which voltage is rectified by a rectifier 34 and smoothed or filtered by a capacitor 35. The voltage thus produced is proportional to the speed of the rotor because the armature reaction becomes ineffective due to the large area and the large magnetic circuit resistance or reluctance of the motor.

The voltage proportional to the speed of the rotor is compared with the voltage of the Zener diode 36. The Zener diode 36 has an anode connected to the base electrode of the sixth transistor 32 and a cathode connected to a common point in the connection between the rectifier 34 and the filter capacitor 35. If the voltage proportional to the speed of the rotor exceeds the Zener voltage in magnitude, an emitter-base current flows through the sixth transistor 32. The sixth transistor 32 is thus switched to its conductive condition and applies a negative potential to the base electrode of the fifth transistor 25. The fifth transistor 25 is then switched to its non-conductive condition and opens the circuit between the control electrodes of the first and second Hall generators 13 and 14.

In actual practice, the speed control or adjustment of the DC motor does not function as a contact adjustment, wherein current either flows or does not flow, but is continuous. The first, second, third and fourth transistors are switched more or less to their conductive conditions, so that there is more or less of a voltage drop at each. A resistor 37 is connected between the collector electrode of the fifth transistor 25 and the base electrode of the sixth transistor 32, and functions to adjust the operation of the transistor 32.

Figure 2:
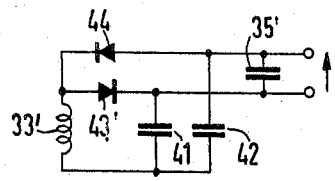
FIG. 2 is a circuit diagram of a modification of a portion of the embodiment of FIG. 1.

In a modification of FIG. 2, the voltage proportional to the speed of the rotor is doubled in magnitude by charging two capacitors 41 and 42 via a pair of diodes 43 and 44 through two half cycles of an AC voltage. The capacitor 41 is charged via the diode 43 and the capacitor 42 is charged via the diode 44. A voltage, which is proportional to the speed of the rotor, but which has twice the magnitude, is derived from the capacitor 35′ and is applied to the sixth transistor 32 (FIG. 1) via the Zener diode 36 (FIG. 1).

Figure 3:
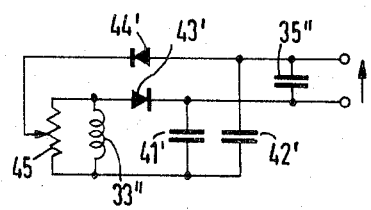
FIG. 3 is a circuit diagram of a further modification of a portion of the embodiment of FIG. 1.

The modification of FIG. 3 permits the adjustment or regulation of the voltage which is utilized to control the speed of the DC motor. The modification of FIG. 3 is similar to the modification of FIG. 2, with the exception of a potentiometer 45 which is connected in parallel with the additional winding 33″. The potentiometer 45 enables the adjustment of the magnitude of the voltage proportional to the speed of the rotor of the DC motor and thereby enables the adjustment of the control voltage utilized to control such speed.

Figure 4:
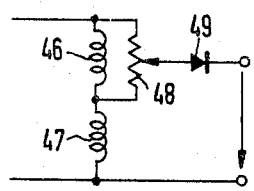
FIG. 4 is a circuit diagram of still a further modification of a portion of the embodiment of FIG. 1.

In the modifivcation of FIG. 4, instead of the single addition winding 33 (FIG. 1), two additional stator windings 46 and 47 are utilized for providing a voltage proportional to the speed of the rotor of the DC motor. The additional winding 46 and the additional winding 47 are connected in series with each other. A potentiometer 48 is connected across the additional winding 46. A voltage proportional to the speed of the rotor is derived from the potentiometer 48 via a diode 49.

Figure 5:
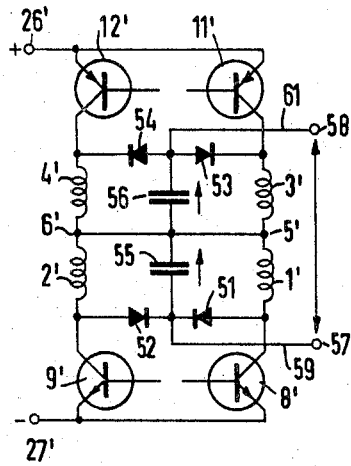
FIG. 5 is a circuit diagram of a modification of another portion of the embodiment of FIG. 1.

In the modification of FIG. 5, a voltage proportional to the speed of the rotor of the DC motor is provided directly by the first, second, third and fourth phase winding portion 1′, 2′, 3′ and 4′. The first, second, third and fourth winding portions correspond to those of FIG. 1. The first, second, third and fourth transistors 8′, 9′, 11′ and 12′ correspond to those of FIG. 1. A plurality of diodes 51, 52, 53 and 54 are connected to the collector electrodes of the first, second, third and fourth transistors in a manner whereby said diodes become conductive when the corresponding switching transistors are on. Thus, the anode of the first diode 51 is connected in common to the first winding portion 1′ and the collector electrode of the first transistor 8′ of the first phase I, and the cathode of said first diode is connected to the cathode of the second diode 52. The anode of the second diode 52 is connected in common to the second winding portion 2′ and the collector electrode of the second transistor 9′ of phase I. The cathode of the third diode 53 is connected in common to the third winding portion 3′ and the collector electrode of the third transistor 11′ of the second phase II and the cathode of said third diode is connected to the anode of the fourth diode 54. The cathode of the fourth diode 54 is connected in common to the fourth winding portion 4′ and the collector electrode of the fourth transistor 12′ of phase II.

A first smoothing or filter capacitor 55 is connected between a common point in the connection between the cathode of the first and second diodes 51 and 52 and a point in the connection between the points 5′ and 6′. A second filter or smoothing capacitor 56 is connected between a point on the connection between the points 5′ and 6′ and a common point in the connection between the anodes of the third and fourth diodes 53 and 54. The diodes 51, 52, 53 and 54 provide two voltages at the points 5′ and 6′ which are of opposite polarity relative to the zero point of the phase windings. The two voltages of opposite polarity charge the filter or smoothing capacitors 55 and 56. The sum of the two voltages of opposite polarity is provided at terminals 57 and 58 and is proportional to the counter EMF, and thus to the speed of the DC motor. The terminal 57 is connected to the common point of the first and second diodes 51 and 52 with the first capacitor 55 via a lead 59 and the terminal 58 is connected to the common point of the third and fourth diodes 53 and 54 with the second capacitor 56 via a lead 61.

Figure 6:
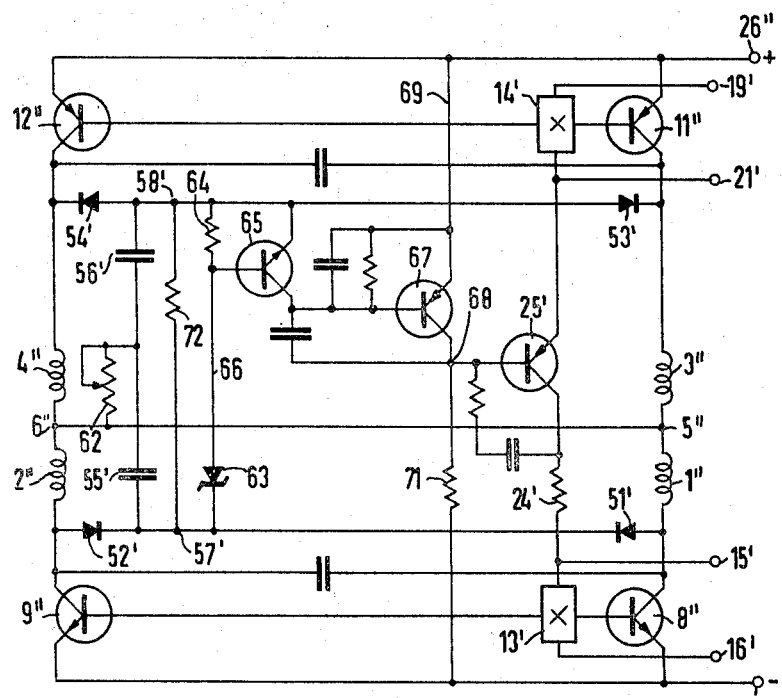
FIG. 6 is a circuit diagram of another embodiment of the speed control circuit of the present invention.

In the embodiment of FIG. 6, the speed of the DC motor is controlled or regulated in accordance with a voltage which is proportional to such speed and which is derived from the phase windings, as in the modification of FIG. 5. The first, second, third, fourth and fifth transistors and the first, second, third and fourth winding portions of FIG. 5 are the same as the corresponding components of the embodiment of FIG. 1. The speed control circuit of FIG. 6 functions at an accuracy of about ±2%. The first, second, third and fourth diodes and the first and second capacitors of FIG. 6 are the same as the corresponding components of the embodiment of FIG. 1.

The filter or smoothing capacitors 55′ and 56′ are charged by the voltages of phase windings 1″, 2″, 3″ and 4″ via a variable resistor 62. The variable resistor 62 is connected between a point common to the points 6″ and 5″ and a point common to the first and second filter capacitors 55′ and 56′. If the speed of the DC motor exceeds a determined value, the counter EMF of said motor exceeds a determined value, and the breakdown voltage of a Zener diode 63 is exceeded.

The Zener diode 63 is connected with its cathode to a point common to the cathodes of the first and second diodes 51′ and 52′ and with its anode to a point common to a resistor 64 and the base electrode of a transistor 65 via a lead 66. The transistor 65 is connected with its emitter electrode to a common point between the anodes of the third and fourth diodes 53′ and 54′ and its collector electrode to the base electrode of a transistor 67.

When the breakdown voltage of the Zener diode 63 is exceeded, said Zener diode provides a base current to the transistor 65 and said transistor 65 is switched to its conductive condition. The collector current of the transistor 65 then controls the conductive condition of the transistor 67 by switching the transistor 67 to its conductive condition. When the transistor 67 is in its conductive condition, it applies a positive polarity voltage to a point 68 in the collector electrode circuit thereof via a lead 69.

When a positive polarity voltage is applied to the point 68, no current flows through a resistor 71 to the base electrode of the transistor 25′, but current flows through the transistor 67. The transistor 25′ is thus switched to its non-conductive condition, and thereby interrupts the base current of the switching transistors 8″, 9″, 11″ and 12″, which base current flows in the connection between the control current electrodes of the first and second Hall voltage generators 13′ and 14′.

When the base current of the switching transistors 8″, 9″, 11″ and 12″ is interrupted or cut off, said transistors are switched to their OFF condition. When the speed of the rotor of the DC motor decreases to below a determined magnitude, the voltage proportional to such speed, of course, also decreases. If the decrease in speed is sufficient, the voltage proportional to said speed decreases to less than the breakdown voltage of the Zener diode 63, which controls the conductive connection of the transistor 65. Thus, when the Zener diode 63 is switched to its non-conductive condition, the transistor 65 is switched to its non-conductive condition and in turn switches the transistor 67 to its non-conductive condition, so that the transistor 25′ is then switched to its conductive condition via current flowing through the resistor 71. This brings the electronic commutator circuit back into normal operation.

Since the critical voltage between the points 57′ and 58′ is constant, the speed of the DC motor may be varied by variation of the variable resistor 62 which, together with the load resistor 72 functions as a voltage divider. The load resistor 72 is connected between the points 57′ and 58′ common to the cathodes of the first and second diodes 51′ and 52′, and common to the anodes of the third and fourth diodes 53′ and 54′, respectively.

The various resistors and capacitors of FIG. 6 which are illustrated but not described, are part of the embodiment of FIG. 6 and aid in the proper operation of said figure, although they are not part of the present invention. The embodiment of FIG. 6, as the embodiment of FIG. 1, operates continuously rather than on an ON-OFF basis.

While the invention has been described by means of specific examples and in specific embodiments, we do not wish to be limited thereto, for obvious modifications will occur to those skilled in the art without departing from the spirit and scope of the invention.

We claim:

1. A speed control circuit for an electronically commutated DC motor having a first phase and a second phase, a first phase stator winding and a second phase stator winding, said first phase stator winding being divided into two winding portions, said second phase stator winding being divided into two winding portions, first connecting means connecting one of the winding portions of said first phase stator winding to one of the winding portions of said second phase stator winding, second connecting means connecting the other of the winding portions of said first phase stator winding to the other of the winding portions of said second phase stator winding, third connecting means connecting a common point of said first connecting means with a common point of said second connecting means, a plurality of switching transistors each having emitter, collector and base electrodes, an emitter-collector path and an emitter-base path, a first of said transistors being connected with its emitter-collector path in series with one of the winding portions of said first phase stator winding, a second of said transistors being connected with its emitter-collector path in series with the other of the winding portions of said first phase stator winding, a third of said transistors being connected with its emitter-collector path in series with one of the winding portions of said second phase stator winding, a fourth of said transistors being connected with its emitter-collector path in series with the other of the winding portions of said second phase stator winding, operating voltage means for applying a DC operating voltage between one of said first and second transistors and one of said third and fourth transistors, first and second Hall generators positioned in determined relation in a magnetic field of said DC motor and each having a pair of Hall voltage electrodes and a pair of control electrodes in spaced determined relation to said pair of Hall voltage electrodes, fourth connecting means connecting the base electrodes of said first and second transistors to each other via the Hall voltage electrodes of said first Hall generator, fifth connecting means connecting the base electrodes of said third and fourth transistors to each other via the Hall voltage electrodes of said second Hall generator, a resistor, sixth connecting means connecting a control electrode of said first Hall generator to a corresponding control electrode of said second Hall generator via said resistor in a manner whereby a current flows through the emitter-base paths of said switching transistors when the Hall voltage of said Hall generators permits such current flow, said speed control circuit comprising a fifth transistor having emitter, collector and base electrodes, an emitter-collector path and an emitter-base path connected in said sixth connecting means with its emitter-collector path connected in series with said resistor between said corresponding control electrodes of said first and second Hall generators; and control means connected to the base electrode of said fifth transistor for controlling the conductive condition of said fifth transistor thereby controlling the circuit condition of said sixth connecting means to control the operative condition of electronic commutation of said DC motor.

2. A speed control circuit as claimed in claim 1, wherein said control means comprises speed voltage means for providing a speed voltage proportional to the speed of said DC motor, constant voltage means for providing a substantially constant voltage, and comparing means for comparing said speed voltage with said constant voltage.

3. A speed control circuit as claimed in claim 1, wherein said control means comprises speed voltage means for providing a speed voltage proportional to the speed of said DC motor, said speed voltage means comprising an additional stator winding of said DC motor, constant voltage means for providing a substantially constant voltage, and comparing means for comparing said speed voltage with said constant voltage.

4. A speed control circuit as claimed in claim 3, wherein said control means further comprises rectifying and filtering means having an output and an input connected to said additional stator winding for rectifying and filtering said speed voltage, said constant voltage means comprising a Zener diode connected to the output of said rectifying and filtering means.

5. A speed control circuit as claimed in claim 4, wherein said control means further comprises a sixth transistor having emitter, collector and base electrodes, an emitter-collector path and an emitter-base path, the collector electrode of said sixth transistor being connected to the base electrode of said fifth transistor and said Zener diode being connected in series with the emitter-base path of said sixth transistor.

6. A speed control circuit as claimed in claim 1, wherein said control means comprises speed voltage means for providing a speed voltage proportional to the speed of said DC motor, variable voltage means for providing a variable voltage and comparing means for comparing said speed voltage with said variable voltage.

7. A speed control circuit as claimed in claim 1, wherein said control means comprises speed voltage means for providing a speed voltage proportional to the speed of said DC motor, said speed voltage means comprising said winding portions and said speed voltage being derived directly from said winding portions.

8. A speed control circuit as claimed in claim 7, further comprising a plurality of diodes for providing said speed voltage from said winding portions, a first of said diodes having a cathode and an anode connected in common to one of the winding portions oft he first phase stator winding and the collector electrode of the first switching transistor, a second of said diodes having an anode connected in common to the other of the winding portions of the first phase stator winding and the collector electrode of the second switching transistor and a cathode connected to the cathode of said first diode, a third of said diodes having an anode and a cathode connected in common to one of the winding portions of the second phase stator winding and the collector electrode of the third switching transistor and a fourth of said diodes having a cathode connected in common to the other of the winding portions of the second phase stator winding and the collector electrode of the fourth switching transistor and an anode connected to the anode of said third diode.

9. A speed control circuit as claimed in claim 8, further comprising a first capacitor and a second capacitor connected in series between a point common to the cathodes of said first and second diodes and a point common to the anodes of said third and fourth diodes and a resistor for charging said first and second capacitors in cooperation with said diodes and for determining the voltage applied to said first and second capacitors, said resistor being connected between a point common to said first and second capacitors and a common point on said third connecting means.

10. A speed control circuit as claimed in claim 9, wherein said resistor is a variable resistor.

References Cited

UNITED STATES PATENTS

| | | | |
|---|---|---|---|
| 3,264,539 | 8/1966 | Sander | 318—138 |
| 3,274,471 | 9/1966 | Moczala | 318—138 XR |
| 3,375,422 | 3/1968 | Boudigues | 318—138 |

ORIS L. RADER, *Primary Examiner.*

G. SIMMONS, *Assistant Examiner.*

U.S. Cl. X.R.

318—254, 327